United States Patent
Chen et al.

(10) Patent No.: US 10,115,120 B2
(45) Date of Patent: Oct. 30, 2018

(54) DYNAMIC DEMAND RESPONSE EVENT ASSESSMENT

(71) Applicant: FUJITSU LIMITED, Kawasaki-shi, Kanagawa (JP)

(72) Inventors: Wei-Peng Chen, Fremont, CA (US); Sanam Mirzazad Barijough, Mountain View, CA (US)

(73) Assignee: FUJITSU LIMITED, Kawasaki (JP)

( * ) Notice: Subject to any disclaimer, the term of this patent is extended or adjusted under 35 U.S.C. 154(b) by 1157 days.

(21) Appl. No.: 14/275,674

(22) Filed: May 12, 2014

(65) Prior Publication Data
US 2015/0324817 A1 Nov. 12, 2015

(51) Int. Cl.
G06Q 10/00 (2012.01)
G06Q 30/02 (2012.01)
G06Q 10/06 (2012.01)
G06Q 50/06 (2012.01)

(52) U.S. Cl.
CPC ..... *G06Q 30/0202* (2013.01); *G06Q 10/0631* (2013.01); *G06Q 30/0206* (2013.01); *G06Q 50/06* (2013.01); *Y04S 20/224* (2013.01)

(58) Field of Classification Search
CPC .................................................. Y04S 20/224
USPC ............................................... 705/7.31, 7.23
See application file for complete search history.

(56) References Cited

U.S. PATENT DOCUMENTS

| | | | | |
|---|---|---|---|---|
| 5,924,486 A | * | 7/1999 | Ehlers | G05D 23/1923 165/238 |
| 2010/0106342 A1 | | 4/2010 | Ko et al. | |
| 2010/0179704 A1 | * | 7/2010 | Ozog | G06Q 10/06315 700/291 |
| 2011/0153102 A1 | | 6/2011 | Tyagi et al. | |
| 2011/0258018 A1 | | 10/2011 | Tyagi et al. | |
| 2012/0232701 A1 | | 9/2012 | Carty et al. | |
| 2012/0296482 A1 | * | 11/2012 | Steven | G06Q 50/06 700/291 |

FOREIGN PATENT DOCUMENTS

WO 2013/039554 A1 3/2013

OTHER PUBLICATIONS

Bartholomew et al., AEIC Load Research Committee, Demand Response Measurement & Verification, Application for Load Research, Mar. 2009. (Year: 2009).*

(Continued)

*Primary Examiner* — Nadja N Chong Cruz
(74) *Attorney, Agent, or Firm* — Maschoff Brennan (57) ABSTRACT

A method of demand response (DR) event issue assessment is described. The method may include receiving parameters that may include one or more of contractual parameters, ambient condition data, historical data, and energy price data. The method may include predicting a customer demand and a customer energy curtailment based on one or more of the parameters. The method may further include calculating a customer participation likelihood based on one or more of the parameters. The method may include determining a price threshold based on one or more of the parameters, the customer energy curtailment, the customer demand, and the customer participation likelihood. The price threshold may represent an energy price at which issuing a DR event is more profitable than not issuing the DR event.

18 Claims, 5 Drawing Sheets

(56) References Cited

OTHER PUBLICATIONS

Kim et al., Automated Price and Demand Response Demonstration for Large Customers in New York City using OpenADR, Lawrence Berkeley National Laboratory, Oct. 2013. (Year: 2013).*

European Communication, Summons to Attend to Oral Proceeding PUrsuant to RUle 115(1) EPC for corresponding application No. 15156457.2, dated May 24, 2017.

EP Office Action dated Sep. 22, 2015 in application No. 15156457.2.

European Communication, Provisions of a copy of the minutes in accordance with Rule 124(4) EPC for corresponding application No. 15156457.2, dated Feb. 5, 2018.

Deemed Saving Estimates for Legacy Air Conditioning and Water Heating Direct Load Control Programs in PJM Region, Ernest Orlando Lawrence Berkeley Nat'l Lab., Apr. 2007.

EP Office Action dated Dec. 19, 2016 as received in Application No. 15156457.2.

* cited by examiner

|  | THI=80 | THI=81 | THI=82 | ... | THI=88 |
|---|---|---|---|---|---|
| s=20% | $P_{ITH} = 90.1$ | $P_{ITH} = 92$ | $P_{ITH} = 93.1$ | ... | $P_{ITH} = 94$ |
| s=30% | $P_{ITH} = 91.1$ | $P_{ITH} = 93.1$ | $P_{ITH} = 94.1$ | ... | $P_{ITH} = 95.1$ |
| s=40% | $P_{ITH} = 91.2$ | $P_{ITH} = 94.1$ | $P_{ITH} = 94.8$ | ... | $P_{ITH} = 95.1$ |
| s=50% | $P_{ITH} = 94.1$ | $P_{ITH} = 95.4$ | $P_{ITH} = 96.1$ | ... | $P_{ITH} = 97.1$ |
| ... | ... | ... | ... | ... | ... |
| s=80% | $P_{ITH} = 96.1$ | $P_{ITH} = 97.4$ | $P_{ITH} = 98.2$ | ... | $P_{ITH} = 99.1$ |

DYNAMIC DEMAND RESPONSE EVENT ASSESSMENT

FIELD

The embodiments discussed herein are related to dynamic demand response event assessment.

BACKGROUND

Utilities incentivize curtailment of energy usage during certain high load periods to increase the ability of the utilities to meet a larger demand or to minimize production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of demand response (DR) event assessment is described. The method may include receiving parameters, which may include one or more of contractual parameters, ambient condition data, historical data, and energy price data. The method may include predicting a customer demand and a customer energy curtailment based on one or more of the parameters. The method may further include calculating a customer participation likelihood based on one or more of the parameters. The method may include determining a price threshold based on one or more of the parameters, the customer energy curtailment, the customer demand, and the customer participation likelihood. The price threshold may represent an energy price at which issuing a DR event is more profitable than not issuing the DR event.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Demand response (DR) events generally include times in which a utility and/or a DR aggregator incentivize curtailment of energy usage by customers. Some embodiments described herein relate to assessing whether to issue a DR event. In particular, some embodiments take into consideration one or more parameters that may be indicative of circumstances that may result in a profitable DR event.

In some DR programs, a decision whether to issue a DR event is based on a static triggering threshold. The static triggering threshold may be based on pre-set factors that may include a particular temperature, a particular humidity, a particular energy price, and the like. However, humidity, temperature, energy prices, and other factors considered in the static triggering thresholds vary. For example, temperature, humidity, and energy prices vary seasonally. As these factors vary, circumstances may exist in which a DR event may be issued that results in a profit. Such DR programs effectively ignore those circumstances by basing the decision of whether to issue the DR event on pre-set factors.

Some embodiments described herein may include a method of dynamically assessing whether to issue a DR event based on one or more parameters that may be periodically updated. The parameters may include, for example, contractual parameters, ambient condition data, historical data, and energy price data. From one or more parameters, a customer demand and a customer energy curtailment may be predicted and a customer participation likelihood may be calculated. Additionally, a price threshold may be determined based on one or more of the parameters, the predicted customer demand, the predicted customer energy curtailment, and calculated customer participation likelihood. The price threshold may represent an energy price at which issuing a DR event is more profitable than not issuing the DR event. The price threshold may be compared to a predicted energy price. If the predicted energy price is greater than the price threshold, then a utility or a DR aggregator may broadcast a DR event to one or more customers.

Additionally, one or more of the parameters may be updated. In response to one or more of the parameters being updated, an updated price threshold may be determined. The updated price threshold may be compared to an updated predicted energy price. As above, if the updated predicted energy price is greater than the updated price threshold, then a utility and/or a DR aggregator may broadcast a DR event to the customers. This and other embodiments are described with reference to the Figures.

Figure 1:
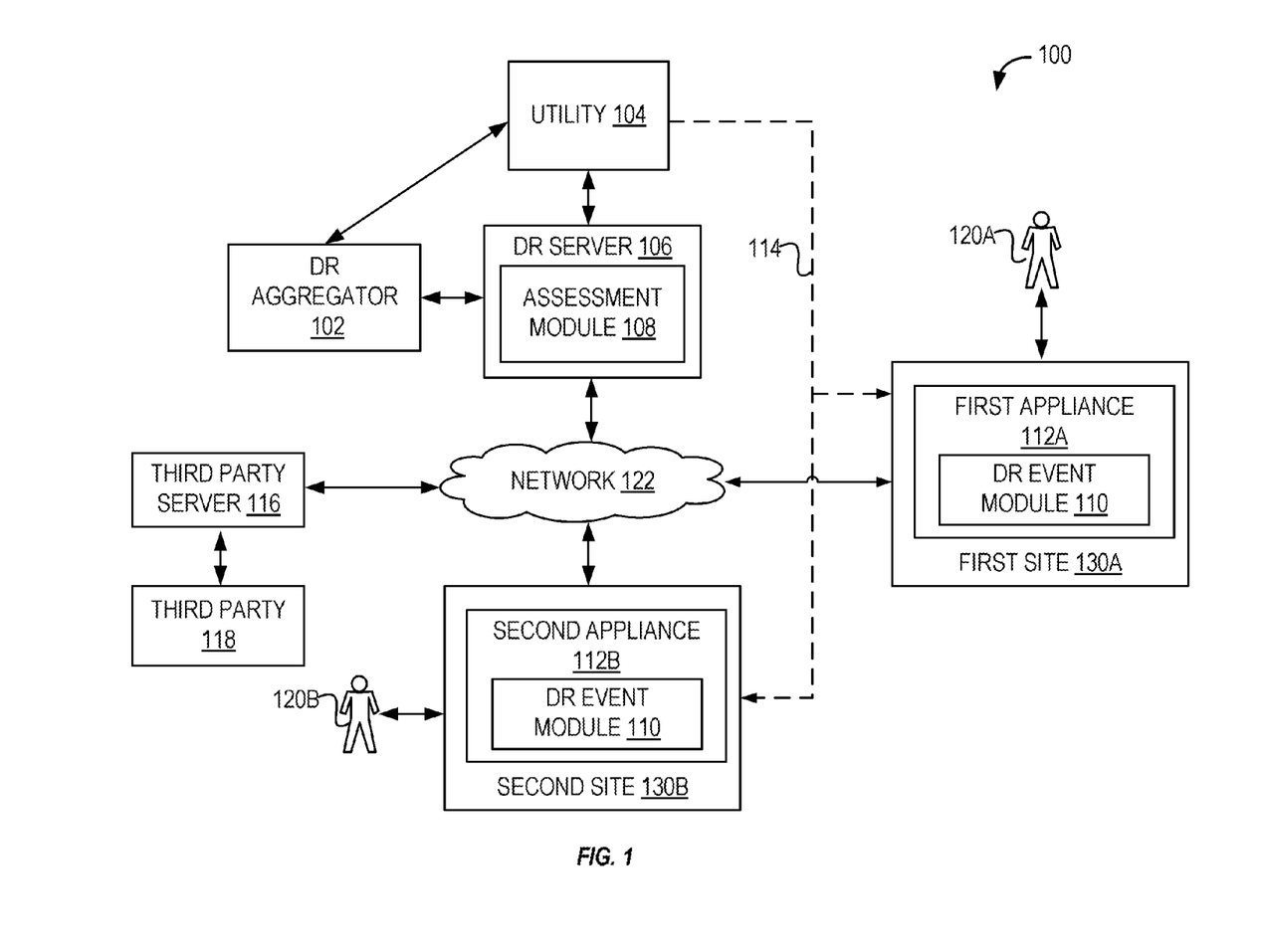
FIG. 1 is a block diagram of an example demand response (DR) system.

FIG. 1 is a block diagram of an example DR system 100, arranged in accordance with at least one embodiment described herein. In the DR system 100, a utility 104 and/or a DR aggregator 102 may assess whether to issue a DR event to sites 130A and 130B (generally, site 130 or sites 130). The assessment as to whether to issue the DR event may be based on one or more parameters, which may be periodically updated. In response to an update of one or more of the parameters, the utility 104 and/or the DR aggregator 102 may re-assess whether to issue the DR event. Accordingly, in the DR system 100, the assessment of whether to issue the DR event may be based on parameters that are dynamic and up-to-date, which may enable the utility 104 and/or the DR aggregator 102 to exploit circumstances in which issuance of the DR event may be profitable.

In the DR system 100 of FIG. 1, the utility 104 may distribute electricity to the sites 130. Accordingly, the DR event described with reference to FIG. 1 may include curtailment of energy usage by the sites 130. Additionally, assessment of whether to issue the DR event may be based on parameters related to energy usage. In some other embodiments, the utility 104 may provide another resource such as natural gas or water to the sites 130. Thus, in these other embodiments, assessment of resource curtailment may be based mutatis mutandis on parameters related to the other resources.

The DR system 100 depicted in FIG. 1 may include the utility 104, the DR aggregator 102, the sites 130, customers 120A and 120B (generally, customer 120 or customers 120), and a third party 118. The utility 104 and/or the DR aggregator 102 may be associated with a DR server 106, the customers 120 may be associated with the sites 130, and the third party 118 may be associated with a third party server 116. The term "associated with," when used herein to refer to a relationship between an entity (e.g., the third party 118 and the utility 104) and a server (e.g., the third party server 116 or the DR server 106) or between the customers 120 and the sites 130, may indicate that the entity and/or the customer 120 owns or otherwise controls, directly or indirectly, the server (116 or 106) or the site 130. For example, information communicated from the DR server 106 may be controlled by the utility 104 and/or the DR aggregator 102 and information communicated to the DR server 106 may be intended for the utility 104 and/or the DR aggregator 102.

The DR server 106, the sites 130, and the third party server 116 may be communicatively coupled via a network 122. The DR server 106, the sites 130, the third party server 116, and entities (e.g., 102, 104, 118, and 120) associated therewith may accordingly communicate information via the network 122.

The network 122 may be wired or wireless, and may have numerous configurations including, but not limited to, a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may be a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., wireless fidelity (Wi-Fi), ZigBee, HomePlug Green, etc.).

In the DR system 100, the utility 104 may distribute electricity, which may also be referred to herein as energy, to the sites 130. The distribution of the electricity, or more generally of any resource, by the utility 104 to the sites 130 is denoted in FIG. 1 at 114. The utility 104 may include any entity involved in production, transmission, and/or distribution of electricity. The utility 104 may be publicly owned or may be privately owned. Some examples of the utility 104 may include a power plant, an energy cooperative, and an independent system operator (ISO). The utility 104 may set terms for the DR event. For example, the utility 104 may set an incentive, a time period, a duration, and an overall energy usage curtailment for a DR event.

The sites 130 may include buildings, structures, equipment, or other objects that use electricity distributed by the utility 104. The sites 130 may include multiple types of structures ranging from private residences to large industrial factories or office buildings.

In some embodiments, the sites 130 included in the DR system 100 may be residences and/or small and medium size business (SMB) sites. The residential and/or SMB sites may introduce complexities and inefficiencies into the DR system 100. Specifically, the residences and/or SMB sites may individually curtail a relatively low amount of energy. Accordingly, the utility 104 and/or the DR aggregator 102 may seek participation by most if not all of the residential and/or SMB sites to in the aggregate make issuance of a DR event economically beneficial.

The sites 130 may include appliances 112A and 112B (generally, appliance 112 or appliances 112). The appliances 112 may include any device that consumes electricity distributed by the utility 104 to the sites 130 and/or that controls operation of a device that consumes electricity distributed by the utility 104 to the sites 130. Specifically, the utility 104 may distribute electricity to a first site 130A. A first appliance 112A may then consume the electricity distributed to the first site 130A. Additionally or alternatively, the first appliance 112A may control consumption of the electricity distributed by the utility 104 by another device. For example, the utility may distribute electricity to the first site 130A. The first appliance 112A may affect operation of another device such that the other device consumes (or does not consume) the electricity distributed to the first site 130A. Some examples of the appliances 112 may include, but are not limited to, a water heater, an air-conditioner, a heater, a piece of commercial or industrial equipment, a thermostat, a controller for a piece of equipment, and the like.

The appliances 112 may include memory, a processor, and network communication capabilities. Additionally, the appliances 112 may include a DR event module 110. Although not specifically shown in FIG. 1, the appliances 112 and/or the DR event modules 110 may be communicatively coupled to the network 122. Accordingly, the DR event module 110 may be configured to receive and implement communications received via the network 122 and/or communicate signals related to the appliances 112 via the network 122.

For example, the appliances 112 may be configured to communicate with the DR server 106 and/or the third party server 116 via the network 122. The communication between the DR server 106 and the appliances may include a command (e.g., a smart appliance control) received from the DR server 106. In response to the command, the DR event module 110 may generate a signal that controls a duty cycle and/or affects operation of the appliance 112. Additionally or alternatively, the DR event module 110 may communicate a signal indicative of the operation of the appliances 112 to the DR server 106 and/or acknowledgment of receipt of the command to the DR server 106.

The customers 120 may include individuals, groups of individuals, or other entities, for example. The sites 130 are generally associated with the customers 120. For example, a first customer 120A may be associated with the first site 130A and a second customer 120B may be associated with a second site 130B. In some embodiments, the customers 120 may determine whether to participate in the DR events issued by the utility 104 and/or the DR aggregator 102. For example, the customers 120 may determine whether to allow curtailment of electricity at the site 130 in response to the DR event issued by the utility 104 and/or the DR aggregator 102. In some embodiments, the customers 120 may make a determination as to whether to participate at the time the DR event is issued or in advance of the issuance of the DR event.

The customers 120 may also agree to terms in a contract with the DR aggregator 102 and/or the utility 104 related to the DR events. For example, by entering into the contract, the customers 120 may agree in advance to participate in the DR events or to allow control of the appliances 112 in the sites 130 during the DR events. The contracts may limit a number of the DR events in which the customers 120 agree to participate. Additionally or alternatively, the contract may include other provisions that may set specific criteria for participation such as duration of the DR events, incentives for participation in the DR events, and the like.

The DR aggregator 102 may act as an intermediary between the utility 104 and the sites 130. An example of the role as the intermediary may include coordination and implementation of the DR events. For example, the DR aggregator 102 may coordinate DR events such that a cumulative energy usage curtailment of the sites 130 is sufficient to meet an overall energy usage curtailment of the DR event. In addition, the DR aggregator 102 may identify the sites 130 and/or the customers 120 to include in the DR system 100. In some embodiments, criteria of the DR event and/or an incentive offered by the utility 104 may be communicated to the DR aggregator 102. The DR aggregator 102 may in turn communicate the criteria to the customers 120 and/or the sites 130 and offer some portion of the incentive to the sites 130 in exchange for participation in the DR event.

The sites 130 may be managed by the DR aggregator 102. The DR aggregator 102 may specifically coordinate implementation of DR events by the sites 130 it manages. The DR aggregator 102 may accordingly have access to historical data of the sites 130 and/or the customers 120. The historical data may include DR event participation history of the sites 130 and/or the customers 120. For example, the historical data may include amounts of energy curtailed in past DR events, reliability of successfully curtailing a requested amount, and the like. The utility 104 may also have access to the historical data and the historical data may be shared between the utility 104 and the DR aggregator 102.

In the depicted embodiment, the DR aggregator 102 may act as an intermediary between the utility 104 and the sites 130 as described above. Inclusion of the DR aggregator 102 is not meant to be limiting. In some embodiments, the utility 104 may directly communicate with the sites 130 or the utility 104 may directly communicate with the first site 130A and the DR aggregator 102 may communicate with the second site 130B.

The third party 118 may include any other entity that may be involved in the DR system 100. Generally, the third party 118 may provide one or more parameters to the DR server 106. The parameters may form some or all of the bases for the assessment. For example, the third party 118 may provide ambient condition data in the DR system 100 via the third party server 116. In this example, the third party 118 may include a private or public weather organization that predicts, publishes, and archives ambient condition data. Additionally or alternatively, the third party 118 may provide energy price data to the DR server 106. Accordingly, the third party 118 may include an ISO and/or a regional transmission organization (RTO) or may receive energy price information from an ISO or a RTO.

The third party server 116 associated with the third party 118 may include a hardware server that includes a processor, memory, and communication capabilities. In the illustrated embodiment of FIG. 1, the third party server 116 may be coupled to the network 122 to send and receive information such as the parameters to and from the sites 130 and/or the DR server 106 via the network 122.

The DR server 106 may include a hardware server that includes a processor, memory, and communication capabilities. In the illustrated embodiment of FIG. 1, the DR server 106 may be coupled to the network 122 to send and receive data and information to and from one or more of the sites 130, the third party server 116, and the appliances 112 via the network 122.

The DR server 106 may include an assessment module 108. The assessment module 108 may be configured to assess whether to issue a DR event in the DR system 100. The assessment may be based on the parameters, which may be periodically updated. In response to one or more of the parameters being updated, the assessment module 108 may be triggered to perform or re-perform an assessment as to whether to issue a DR event. By performing the assessment in response to one or more of the parameters being updated, the DR aggregator 102 and/or the utility 104 may exploit DR event opportunities under a variety of circumstances.

The assessment of whether to issue the DR event may be based on a relationship between a price threshold and a predicted energy price during a particular time period. The price threshold may represent a minimum price at which issuing a DR event is more profitable than not issuing the DR event. For example, when the predicted energy price is higher than the price threshold, it may be profitable for the utility 104 and/or the DR aggregator to issue the DR event. When the energy price is less than the price threshold, it may not be profitable for the utility 104 and/or the DR aggregator to issue the DR event.

In some embodiments, the assessment module 108 may be configured to predict the energy price for a particular time period. Additionally or alternatively, the assessment module 108 may receive the predicted energy price via the network 122. The predicted energy price may be based on real-time energy prices, which may be updated according to a set time period. For example, some ISOs update the real-time energy price every five minutes. The real-time energy price may be a basis for the predicted energy price. The predicted energy price may also be based on day-ahead energy prices. The day-ahead energy price may be set in a day-ahead energy market. The day-ahead energy price may or may not differ from the real-time energy price.

The price threshold may be determined based on an optimization equation that may take into consideration one or more of the parameters and/or values derived therefrom. Some additional details of an example optimization equation are discussed herein below. Additionally, the assessment module 108 may be configured to estimate a risk involved in issuing the DR event. For example, the assessment module 108 may be configured to estimate a risk of missing a future DR event opportunity. The risk estimated by the assessment module 108 may be taken into consideration with the price threshold/energy price relationship when determining whether to issue the DR event. Additionally, the assessment module 108 may be configured to estimate a profit. The profit may be a predicted profit that the DR aggregator 102 and/or the utility 104 may obtain from issuing the DR event. In some embodiments, the profit may be represented as a savings. For example, the savings may include a net savings or a percentage savings actualized by the DR aggregator 102 and/or the utility 104 by issuing the DR event. The profit estimated by the assessment module 108 may be taken into consideration with the price threshold/energy price relationship and/or the risk when determining whether to issue the DR event.

In these and other embodiments, the assessment module 108 may be configured to broadcast DR event criteria to the appliances 112 and/or the sites 130. In particular, in the DR system 100, the DR events may be implemented according to one or more DR programs. The DR programs may include a direct load control (DLC) program. In the DLC program, the DR event may be initiated directly by the utility 104 and/or the DR aggregator 102. In these and other embodiments, the assessment module 108 may broadcast the DR event criteria including commands to the appliances 112. The commands may affect operation of the appliances 112 (e.g., turn the appliance 112 off and on) according to a control strategy. In exchange for participation, the customer 120 may receive a fixed incentive and/or a variable incentive that may be based on a number of DR events in which the customers 120 participate. In some embodiments, the DR events may be issued according to another DR program such as a price-based DR program. Price-based DR programs may include a peak day pricing (PDP) program. In the PDP program, the customers 120 may be subject to different energy rates during certain time periods.

As stated above, in some DR programs energy curtailment may be controlled according to a control strategy. The control strategy may include a strategy for curtailing a load of one or more of the customers 120. For example, the control strategy may include a 50% cycling strategy. The 50% cycling strategy may include cycling the appliance 112 at one of the sites 130 off for two 15-minute periods in one hour such that the appliance 112 is off for 50% of the hour.

Modifications, additions, or omissions may be made to the DR system 100 without departing from the scope of the present disclosure. Specifically, embodiments depicted in FIG. 1 include two customers 120, two sites 130 each including one appliance 112, one DR server 106, one DR aggregator 102, one utility 104, one third party 118, and one third party server 116. However, the present disclosure applies to DR systems that may include one or more of the customers 120, one or more of the sites 130 each including one or more of the appliances 112, one or more of the third parties 118, one or more of the utilities 104, one or more of the DR aggregators 102, one or more of the DR servers 106, or any combination thereof. The present disclosure may also apply to DR systems in which electricity or any other resource may be curtailed.

Moreover, the separation of various components in the embodiments described herein is not meant to indicate that the separation occurs in all embodiments. Moreover, it may be understood with the benefit of this disclosure that the described components may be integrated together in a single component or separated into multiple components.

The assessment module 108 and/or the DR event module 110 may include code and routines. In some embodiments, the assessment module 108 and/or the DR event module 110 may act in part as a thin-client application that may be stored on a computing device and in part as components that may be stored on the DR server 106 or the appliance 112, for instance. In some embodiments, the assessment module 108 and/or the DR event module 110 may be implemented using hardware including a field-programmable gate array (FPGA) or an application-specific integrated circuit (ASIC). In some other instances, the assessment module 108 and/or the DR event module 110 may be implemented using a combination of hardware and software.

In the DR system 100, memory such as memory in the appliances 112, the third party server 116, and the DR server 106 may include a non-transitory memory that stores data for providing the functionality described herein. The memory may be included in storage that may include a dynamic random access memory (DRAM) device, a static random access memory (SRAM) device, flash memory, or other suitable memory device. In some embodiments, the storage also includes a non-volatile memory or similar permanent storage device and/or media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
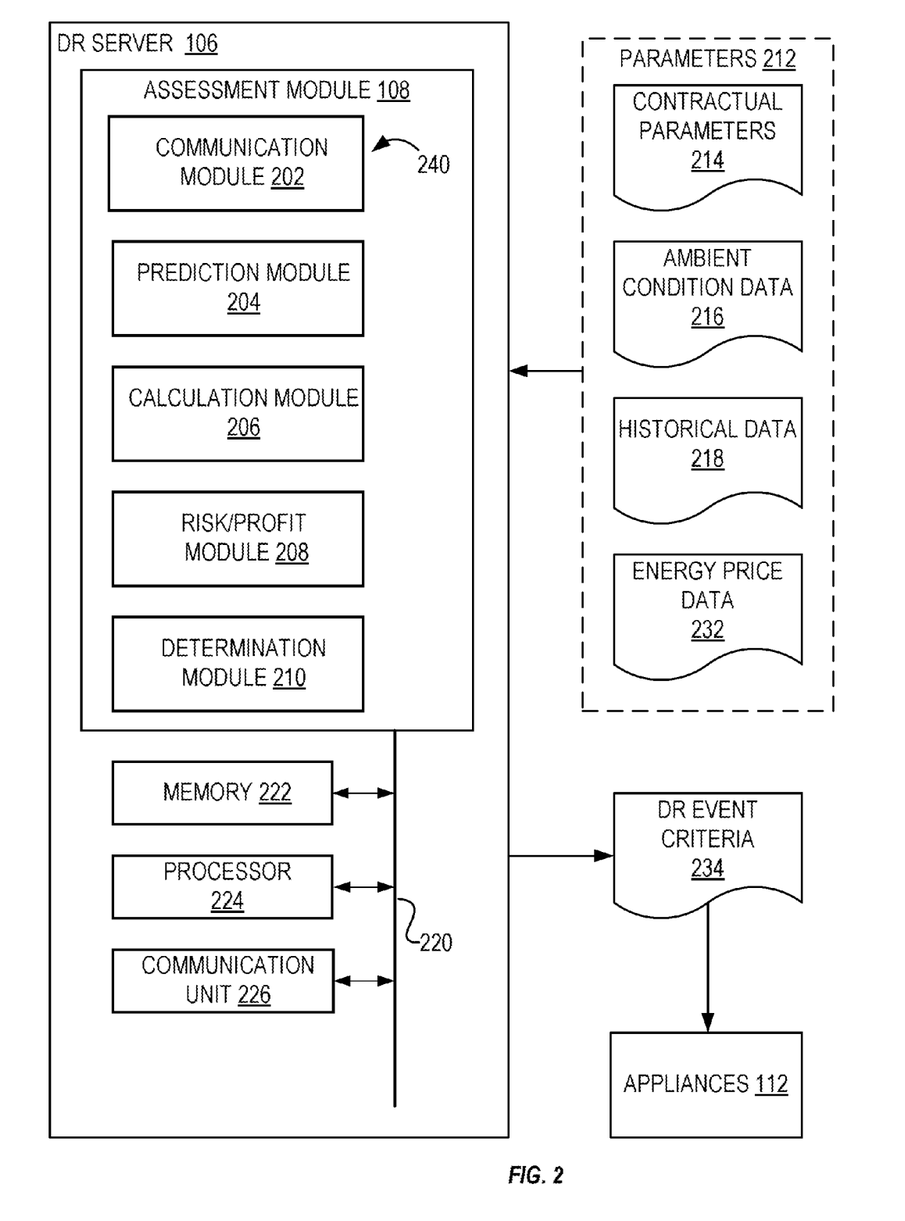
FIG. 2 is a block diagram of an example DR server that may be implemented in the DR system of FIG. 1.

Referring now to FIG. 2, an example of the assessment module 108 is shown in more detail. FIG. 2 is a block diagram of the DR server 106 that includes the assessment module 108, a processor 224, a memory 222, and a communication unit 226. The components of the DR server 106 may be communicatively coupled by a bus 220. In the depicted embodiment, the DR server 106 includes the assessment module 108. More generally, the assessment module 108 may be included in a computing device including one or more of the memory 222, the processor 224, and the communication unit 226 communicatively coupled by the bus 220 as described herein.

The processor 224 may include an arithmetic logic unit (ALU), a microprocessor, a general-purpose controller, or some other processor array to perform computations and software program analysis. The processor 224 may be coupled to the bus 220 for communication with the other components (e.g., 108, 226, and 222). The processor 224 generally processes data signals. The processor 224 may include various computing architectures including a complex instruction set computer (CISC) architecture, a reduced instruction set computer (RISC) architecture, or an architecture implementing a combination of instruction sets. Although FIG. 2 includes a single processor 224, multiple processors may be included in the DR server 106. Other processors, operating systems, and physical configurations may be included in other embodiments.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may be a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 226 may be configured to transmit and receive data to and from the third party server 116, the sites 130, the appliances 112, or some combination thereof. The communication unit 226 may be coupled to the bus 220. In some embodiments, the communication unit 226 may include a port for direct physical connection to the network 122 or to another communication channel. For example, the communication unit 226 may include a USB, SD, CAT-5, or similar port for wired communication with the components of the DR system 100. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a cellular communications transceiver for sending and receiving data over a cellular communications network including via SMS, MMS, HTTP, direct data connection, WAP, e-mail, or another suitable type of electronic communication. In some embodiments, the communication unit 226 includes a wired port and a wireless transceiver. The communication unit 226 may also provide other conventional connections to the network 122 for distribution of files and/or media objects using standard network protocols including transmission control protocol/internet protocol (TCP/IP), HTTP, HTTP secure (HTTPS), and simple mail transfer protocol (SMTP), etc.

In the embodiment of FIG. 2, the assessment module 108 may include a communication module 202, a prediction module 204, a calculation module 206, a risk/profit module 208, and a determination module 210. The communication module 202, the prediction module 204, the calculation module 206, the risk/profit module 208, and the determination module 210 are collectively referred to as modules 240.

One or more of the modules 240 may be implemented as software including one or more routines configured to perform one or more operations. The modules 240 may include a set of instructions executable by the processor 224 to provide the functionality described below. In some instances, the modules 240 may be stored in or at least temporarily loaded into the memory 222 of the DR server 106 and may be accessible and executable by the processor 224. One or more of the modules 240 may be adapted for cooperation and communication with the processor 224 and components of the DR server 106 via the bus 220.

The communication module 202 may be configured to handle communications between the assessment module 108 and other components of the DR server 106 (e.g., 224, 222, and 226). The communication module 202 may be configured to send and receive data, via the communication unit 226 to the third party server 116, the sites 130, the appliances 112, or some combination thereof. In some instances, the communication module 202 may cooperate with the other modules (e.g., 204, 206, 208, and 210) to receive and/or forward, via the communication unit 226, data from one or more of the third party server 116, the appliances 112, and the sites 130.

For example, the communication module 202 may be configured to receive parameters 212. The parameters 212 may be communicated via the network 122 from the third party server 116 and/or the sites 130. Additionally, the parameters 212 may be locally calculated or collected at the DR sever 106, the DR aggregator 102, the utility 104, or some combination thereof. For example, the utility 104 may collect meter readings from the sites 130 and may calculate one or more parameters 212 from the meter readings. The parameters 212 may be periodically updated. For instance, the communication module 202 may receive one or more parameters 212 at different times. The parameters 212 may include, but are not limited to, contractual parameters 214, ambient condition data 216, historical data 218, and energy price data 232.

The contractual parameters 214 may include one or more terms of an agreement between the customers 120 and the DR aggregator 102 and/or the utility 104. For example, in the DR system 100, the DR event may be implemented according to a DLC program. In these and other embodiments, the contractual parameters may include the particular number of DR events in which the customer 120 has agreed to participate, whether the customer 120 may opt out of participation, incentives for participation, and the like. In other embodiments, the DR events may be implemented according to a ToU program or a PDP program, for instance. In these and other embodiments, the contractual parameters may include incentives for participation, different energy rates charged to the customers 120 at certain times, and the like.

The ambient condition data 216 may include data indicating a current, past, or predicted ambient condition of one or more of the sites 130. For example, the ambient condition data 216 may include, but are not limited to, temperature, humidity, ambient pressure, and precipitation levels. The ambient condition data 216 may be communicated to the DR server 106 from the third party server 116 in some embodiments. For example, the third party 118 may include a weather station that publishes the ambient condition data 216 of the sites 130.

In some embodiments, the ambient condition data 216 may include a temperature-humidity index (THI). The THI may be calculated according to an example THI equation:

$$THI=17.5+0.55*DB+0.2*WB$$

In the THI equation, the variable THI represents the temperature-humidity index. The variable DB represents the dry bulb temperature. The variable WB represents the wet bulb temperature. Using the THI equation, a current value for THI may be calculated. The values 17.5, 0.55, and 0.2 may change. Some additional details of calculating the THI may be found in RLW Analytics, *Deemed Saving Estimates for Legacy Air Conditioning and Water Heating Direct Load Control Programs in PJM Region*, ERNEST ORLANDO LAWRENCE BERKELEY NAT'L LAB., April, 2007, which is incorporated herein by reference in its entirety. In some embodiments, the THI may be calculated using another THI equation. The THI may be input into an optimization equation and/or used in a table of price thresholds.

The historical data 218 may include energy usage data of the sites 130. For example, the sites 130 may include a meter configured to read energy usage of the sites 130. The utility 104 and/or the DR aggregator 102 may collect and/or aggregate the energy usage data from the sites 130. In some circumstances, the meters may include smart meters. The smart meters may communicate energy usage data to the utility 104 and/or the DR aggregator via the network 122. The energy usage data communicated from the smart meters may be indicative of substantially real-time energy usage data. As used herein the term "substantially real-time" may include data that is communicated without material delay or that has to be communicated as quickly as possible via the network 122.

In some embodiments, the historical data 218 may be aggregated or otherwise processed to determine energy usage behaviors of one or more of the customers 120. For example, the energy usage data may be used to determine how frequently the customer 120 and/or the site 130 participated in the DR events and whether or to what extent the customers 120 curtailed energy during the DR events. The historical data 218 may also be related to one or more of the energy price data 232, the ambient condition data 216, and the contractual parameters 214. For example, energy usage of the customer 120 may be related (e.g., time-series synchronized) to the THI.

The energy price data 232 may include real-time energy prices and/or day-ahead energy prices. The energy price data 232 may be communicated by the third party server 116 via the network 122 to the communication module 202. For example, the third party 118 may include an ISO that publishes the energy price data 232 such that the DR server 106 may access it. The energy price data 232 may be periodically posted or communicated according to a particular interval.

The communication module 202 may communicate one or more of the parameters 212 to the prediction module 204, the calculation module 206, the risk/profit module 208, and the determination module 210. Based on one or more of the parameters 212, the prediction module 204 may be configured to predict a customer demand for one or more of the customers 120. The predicted customer demand may indicate an energy load of each of the sites 130 during a DR event or during another specific period of time. In some embodiments, the prediction module 204 may predict customer demand based on meter readings of the sites 130, past energy usage data of the sites 130, the ambient condition data 216, or some combination thereof. For example, the prediction module 204 may predict customer demand as a function of THI and/or meter readings prior to an interval (e.g., the past one hour) in which an assessment is being performed by the assessment module 108. Additionally or alternatively, the prediction module 204 may predict the customer demand as some percentage of a meter reading (e.g., current demand±10%), may predict the customer demand based on customer demand during historical periods having similar ambient condition data 216, and/or may predict the customer demand based on a customer demand as indicated by meter readings, which may be check against potential energy usage changes due to a predicted ambient condition data.

The prediction module 204 may be configured to predict a predicted energy price for a particular time period. The prediction module 204 may base the predicted energy price on the energy price data 232, the historical data 218, the ambient condition data 216, or some combination thereof. For example, the prediction module 204 may predict the predicted energy price based on real-time energy prices, day-ahead energy prices, historical energy usage data, predicted or past ambient condition data, and the like.

Based on one or more of the parameters 212, the prediction module 204 may be configured to predict a customer energy curtailment for one or more of the customers 120. The predicted customer energy curtailment may indicate an amount of energy that each of the sites 130 may curtail during a DR event or another specific period of time. The prediction module 204 may predict customer energy curtailment based on the historical data 218, meter readings, the ambient condition data 216, and a control strategy. For example, in some embodiments, the predicted customer energy curtailment may be a function of THI and the control strategy.

In some embodiments, the prediction module 204 may be configured to predict the customer energy curtailment, the customer demand, and the predicted energy price each time one or more of the parameters 212 involved in one or more of these predictions is updated. The prediction module 204 may communicate the customer energy curtailment, the customer demand, and the predicted energy price to the determination module 210 and/or the risk/profit module 208.

The calculation module 206 may be configured to calculate customer participation likelihood for one or more of the customers 120. The calculated customer participation likelihood may indicate a likelihood that each of the customers 120 will participate in the DR event if issued and/or curtail energy in an amount sufficient for compliance with the DR event. In some embodiments, the customer participation likelihood may be represented by a random variable with a particular probability distribution.

The random variable may be based on statistical analysis of the historical data 218. For example, the random variable may be based on statistical analysis of previous participation by the customer 120 or the site 130, previous participation under certain ambient conditions, reliability of energy curtailment by the customer 120 or the site 130, whether the appliances 112 involved in the DR event are controlled through commands (e.g., in a DLC program), whether there is a limit to a number of DR events in which the customer 120 agrees to participate, or some combination thereof. In some embodiments, the calculation module 206 may be configured to calculate the customer participation likelihood each time one or more of the parameters 212 involved in this calculation is updated. The calculation module 206 may communicate the customer participation likelihood to the determination module 210 and/or the risk/profit module 208.

The determination module 210 may be configured to receive the predicted customer demand, the predicted customer energy curtailment, the calculated customer participation likelihood, the parameters 212, or some combination thereof. The determination module 210 may input one or more of the parameters 212, the predicted customer demand, the predicted customer energy curtailment, the calculated customer participation likelihood, into an optimization equation configured to determine a price threshold. In some embodiments, the determination module 210 may be configured to determine the price threshold each time one or more of the parameters 212, the predicted customer demand, the predicted customer energy curtailment, or the calculated customer participation likelihood are updated.

In some embodiments, the optimization equation includes the example optimization equation:

$$\min(P_{iTH})|\{E[R_{DR}(\vec{A_i})-\text{Cost}_{DR}(\vec{A_i},P_{iTH})-\text{Inc}_{DR}(\vec{A_i})]\geq E[R-\text{Cost}(P_{iTH})]\}$$

In the optimization equation, the operator $\min(\ )|\{\ \}$ represents an operation to determine a minimum value of a variable in the parentheses such that a condition in the brackets is satisfied. The operator $E[\ ]$ represents the expected value. The variable $P_{iTH}$ represents a price threshold. $R_{DR}(\ )$ represents DR event revenue from selling electricity to the customers 120 when a DR event is issued. $\text{Cost}_{DR}(\ )$ represents a DR event cost for purchasing electricity and operations costs when a DR event is issued. $\text{Inc}_{DR}(\ )$ represents an incentive paid to participate in the DR event. The incentive paid may be paid to the customers 120. The incentive paid may be determined according to the contractual parameters 214 in some embodiments. R represents non-DR event revenue from selling electricity to the customers 120 when no DR event is issued. Cost( ) represents a non-DR event cost for purchasing electricity when no DR event is issued. The variable i represents an interval in which the assessment is being performed. The variable $\vec{A_i}$ represents the random variable that may denote the customer participation likelihood of the customers 120 at the interval i.

In some embodiments, the random variable may include a matrix having a dimension defined by a number of the customers 120 (N) by a number of future events indicator ($E_i$) (e.g., N×$E_i$). The future events indicator may represent a number of future DR events that the utility 104 and/or the DR aggregator 102 are allowed to send at the interval i. The future events indicator may depend on one or more contractual parameters 214.

The optimization equation may determine a minimum value of the price threshold ($P_{iTH}$) such that profit when a DR event is issued (e.g., $E[R_{DR}(\vec{A_i})-\text{Cost}_{DR}(\vec{A_i},P_{iTH})-\text{Inc}_{DR}(\vec{A_i})]$) is greater than a profit when no DR event is issued (e.g., $E[R-\text{Cost}(P_{iTH})]$). The price threshold may be determined according to the optimization equation at each of multiple intervals (i) using the parameters 212 available at each of the intervals. For example, each time one or more of the parameters 212 are updated, the determination module 210 may solve the optimization equation.

In some embodiments, the DR event revenue ($R_{DR}(\ )$) may be calculated according to an example DR event revenue equation:

$$R_{DR}(\vec{A_i}) = \sum_j \sum_c R(c)A_i(c, j)[D_i(c, THI) - K_i(c, THI, s)] ++$$

$$\sum_j \sum_c R(c)[1 - A_i(c, j)]D_i(c, THI)$$

In the DR event revenue equation, $R_{DR}(\ )$, i, and $\vec{A_i}$ are as described above. The variable c represents an indexing variable related to the customers 120. The indexing variable c may have a range from 1 to the number of the customers 120 (N). The variable j represents a second indexing variable designating future DR events. Accordingly, $A_i(c, j)$ may represent a probability that a specific customer 120 assigned an indexing variable c may participate in next j events. Likewise, $1-A_i(c, j)$ may represent a probability that a specific customer 120 assigned an indexing variable c may not participate in the next j events. In embodiments in which there is no limit as to a number of DR events that may be issued by the DR aggregator 102 and/or the utility 104, the variable j may be omitted. R(c) represents an energy price for a specific customer identified by the indexing variable c. $D_i(\ )$ represents the predicted customer demand at an interval designated by a variable i. $K_i(\ )$ represents the predicted customer curtailment at the interval designated by the variable i. The value THI represents the THI. The value s represents a control strategy. Generally, the DR event revenue equation sums a first portion (e.g., $\Sigma\Sigma\ R(c)A_i(c, j)[D_i(c,THI)-K_i(c,THI,s)]$) that may be generated by the customers 120 participating in the DR events with a second portion (e.g., $\Sigma\Sigma\ R(c)[1-A_i(c, j)]D_i(c,THI)$) that may be generated by the customers 120 not participating in the DR events.

The DR event cost ($\text{Cost}_{DR}(\ )$) may be calculated according to an example DR event cost equation:

$$\text{Cost}_{DR}(\vec{A_i}, P_{iTH}) =$$

-continued $$\sum_j \sum_c P_{iTH}A_i(c, j)[D_i(c, THI) - K_i(c, THI, s)] ++ \sum_j \sum_c P_{iTH}$$

$$[1 - A_i(c, j)]D_i(c, THI) ++ \sum_j \sum_c \text{Cost}_{DR\text{-}Op}(c)A_i(c, j)$$

In the DR event cost equation, $\text{cost}_{DR}(\ )$, $\vec{A_i}$, $K_i(\ )$, $D_i(\ )$, THI, c, j, s, $P_{iTH}$, and $A_i(c,j)$ are as discussed above. $\text{Cost}_{DR\text{-}OP}(\ )$ represents operational costs for issuing a DR event. Generally, the DR event cost equation sums a first portion (e.g., $\Sigma\Sigma\ P_{iTH}\ A_i(c, j)[D_i(c,THI)-K_i(c,THI,s)]$) that may be generated by the customers 120 participating in the DR events with a second portion (e.g., $\Sigma\Sigma\ P_{iTH}\ [1-A_i(c, j)]D_i(c,THI)$) that may be generated by customers not participating in the DR events, and the operation costs $\text{Cost}_{DR\text{-}OP}(\ )$ for issuing the DR events.

The incentive paid to the customers 120 to participate in a DR event ($\text{Inc}_{DR}(\vec{A_i})$) may be calculated according to an example incentive payment equation:

$$\text{Inc}_{DR}(\vec{A_i}) = \sum_j \sum_c P_{DR}A_i(c, j)K_i(c, THI, s)$$

In the incentive payment equation, $\text{Inc}_{DR}(\ )$, $\vec{A_i}$, $K_i(\ )$, THI, c, s, and $A_i(c,j)$ are as discussed above. $P_{DR}$ represents the price paid per unit of energy curtailed during the DR event. The price paid per unit of energy curtailed may be based on a particular DR program and/or one or more of the contractual parameters 214. In some embodiments, the incentive paid to customers 120 may be calculated according to another incentive payment equation. For instance, the incentive paid may be a fixed amount so long as a customer 120 follow instructions involved in a DR event.

The non-DR event revenue (R) may be calculated according to an example non-DR event revenue equation:

$$R = E_i \sum_c R(c)D_i(c, THI)$$

In the non-DR event revenue equation, Di( ), c, R(c), THI, and $E_i$ are as discussed above. In the non-DR event revenue equation, R represents the non-DR event revenue. In embodiments in which there is no limit to the number of future DR events, the future events indicator may be omitted from the non-DR event revenue equation.

The non-DR event cost (Cost( )) for purchasing electricity when no DR event is issued may be calculated according to an example cost equation:

$$\text{Cost}(P_{iTH}) = E_i \sum_c P_{iTH}D_i(c, THI)$$

In the non-DR event cost equation Cost( ), $P_{iTH}$, $E_i$, c, $D_i(\ )$, and THI are as discussed above. In embodiments in which there is no limit to the number of future DR events, the future events indicator may be omitted from the non-DR event cost equation. The determination module 210 may be configured to communicate the price threshold to display such that the price threshold may be evaluated.

In some embodiments, the price threshold may be evaluated along with a risk and/or a profit estimated by the risk/profit module 208. The risk/profit module 208 may be configured to receive one or more of the parameters 212, the predicted customer demand, the predicted customer energy curtailment, and the calculated customer participation likelihood. Based on one or more of the parameters 212, the predicted customer demand, the predicted customer energy curtailment, and the calculated customer participation likelihood, the risk/profit module 208 may estimate the risk and/or the profit associated with issuance of the DR event.

For example, the risk/profit module 208 may be configured to estimate risk. In some embodiments, the risk may include a risk that a future DR event may be missed if a current DR event is issued for a current interval. The risk of missing a future DR event may be relevant in embodiments in which the number of DR events that are issued by the DR aggregator 102 and/or the utility 104 is limited, for instance.

In some embodiments, the risk/profit module 208 may estimate the risk according to an example risk equation:

$$\text{risk} = \frac{T - E_i}{T} \times \alpha$$

In the risk equation, the risk represents the estimated risk. The variable T represents a number of future days that an energy price is expected to be more than the determined price threshold. The variable T may be predicted based on the historical data 218 such as historical energy usage data and/or price thresholds determined based on past parameters 212. The variable $\alpha$ represents a reliability of the predicted value of the variable T. $E_i$ represents the future events indicator discussed above.

The risk/profit module 208 may estimate the risk each time the predicted energy price is greater than the price threshold. Based on the relationship between the predicted energy price and the price threshold and/or the risk, the DR aggregator 102 and/or the utility 104 may determine whether or not to issue the DR event. For example, in response to the predicted energy price being higher than the price threshold and the risk being acceptable, the communication module 202 may broadcast DR event criteria 234, which may include commands, to the appliances 112. In response to the predicted energy price being lower than the price threshold, the communication module 202 may not broadcast the DR event criteria 234. Additionally, in response to the predicted energy price being higher than the price threshold but the risk being unacceptable, the communication module 202 may not broadcast the DR event criteria 234.

In some embodiments, the utility 104 and/or the DR aggregator 102 may set a risk threshold. The risk may be acceptable when the estimated risk is below the risk threshold and unacceptable when the estimated risk is above the risk threshold. An example of a risk threshold may be about twenty percent. In response to the estimated risk being above the twenty percent, the estimated risk may be unacceptable.

Additionally, the risk/profit module 208 may be configured to estimate profits that may be actualized due to issuance of the DR event. The profit may take the form of savings. In some embodiments, the savings may be represented as a percentage savings and/or a net savings. The risk/profit module 208 may calculate the percentage savings according to a percentage savings equation:

$$\text{savings \%} = \frac{E[R_{DR}(\vec{A_i}) - \text{Cost}_{DR}(\vec{A_i}, P_R) - \text{Inc}_{DR}(\vec{A_i})] - E[R - \text{Cost}(P_R)]}{E[R - \text{Cost}(P_R)]} \times 100$$

In the percentage savings equation, E[ ], Cost( ), $\text{Cost}_{DR}$( ), $\text{Inc}_{DR}$( ), $\vec{A_i}$, R, $R_{DR}$( ), and i represent the values discussed above. The variable $P_R$ represents a predicted real-time price. For example, the predicted real-time price may be a predicted real-time price for a particular time period (e.g., a next hour). The value savings % represents an estimated percentage savings. The percentage savings equation may assume that THI and the control strategy are set from the particular time period.

In some embodiments, the risk/profit module 208 may estimate the profit as a net savings. The net savings may be estimated according to a net savings equation:

$$\text{savings \$} = E[R_{DR}(\vec{A_i}) - \text{Cost}_{DR}(\vec{A_i}, P_R) - \text{Inc}_{DR}(\vec{A_i})] - E[R - \text{Cost}(P_R)]$$

In the net savings equation, savings $ represents the net savings. Cost( ), $\text{Cost}_{DR}$( ), $\text{Inc}_{DR}$( ), $\vec{A_i}$, R, $R_{DR}$( ), E[ ], and i represent the values discussed above. In the percentage savings equation and the net savings equation, the profit may be estimated as the revenue saved at the predicted energy price due to issuance of the DR event.

The profit may be estimated each time the predicted energy price is greater than the price threshold. Based on the relationship between the predicted energy price and the price threshold and/or the profit, the DR aggregator 102 and/or the utility 104 may determine whether to issue the DR event. For example, in response to the predicted energy price being higher than the price threshold and the profit being acceptable, the communication module 202 may broadcast the DR event criteria 234 to the appliances 112 via the communication unit 226 and the network 122. In response to the predicted energy price being lower than the price threshold, the communication module 202 may not broadcast the DR event criteria 234. Additionally, in response to the predicted energy price being higher than the price threshold, but the profit being unacceptable, the communication module 202 may not broadcast the DR event criteria 234.

In some embodiments, the utility 104 and/or the DR aggregator 102 may set a profit threshold. The profit may be acceptable when the estimated profit is above the profit threshold and unacceptable when the estimated profit is below the profit threshold. An example of a profit threshold may be about ten percent or about $50,000. In response to the estimated profit being above the ten percent or above the $50,000, the estimated risk may be acceptable.

In some embodiments, price thresholds may be determined for multiple values of the THI and/or multiple control strategies. For example, with reference to FIG. 3, an example table 300 of price thresholds is depicted. The table 300 may include THI values 304A-304D (generally, THI value 304 or THI values 304). The THI values 304 may be selected for a predicted range based on predicted seasonal variation, for example. The table 300 may also include control strategy values 302A-302E (generally, strategy value 302 or strategy values 302). The strategy values 302 may include one or more control strategies that may be implemented in a DR system such as the DR system 100 of FIG. 1. At each interval (e.g., in response to update of one or more parameters) the table 300 may be populated with price thresholds 306 (only one price threshold is labeled in FIG. 3). The utility 104 and the DR aggregator 102 may determine, based on the table 300, whether to issue a DR event.

Figure 3:
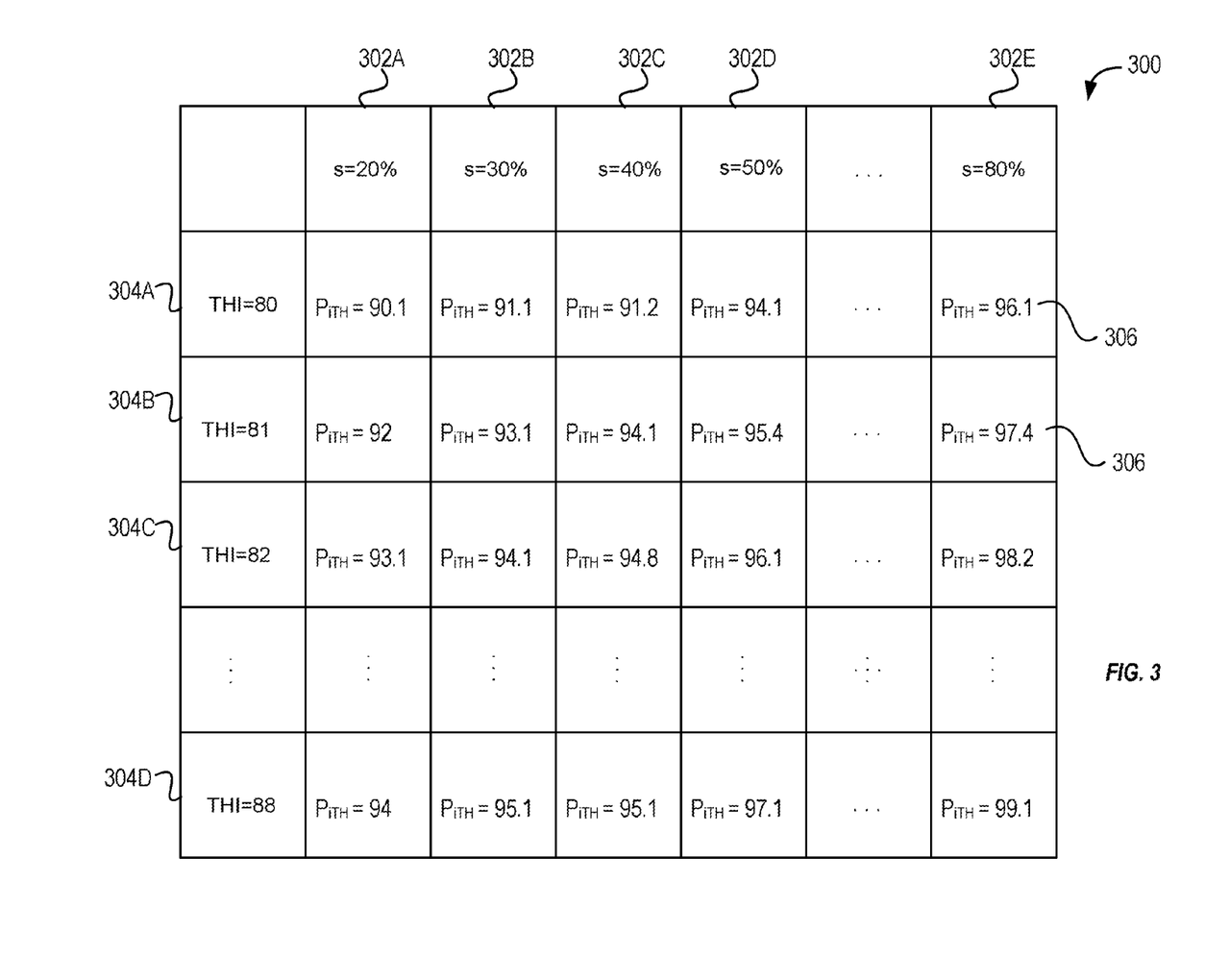
FIG. 3 depicts an example table of price thresholds that may be generated in the example DR system of FIG. 1.

The table 300 represents a non-limiting example of a table of price thresholds. The strategy values 302, the THI values 304, the price thresholds 306, or any combination thereof may vary in other tables. Additionally, the price thresholds 306 represent example values and are not meant to be limiting to the optimization equation or any sub-equation that may be included therein.

Figure 4A:
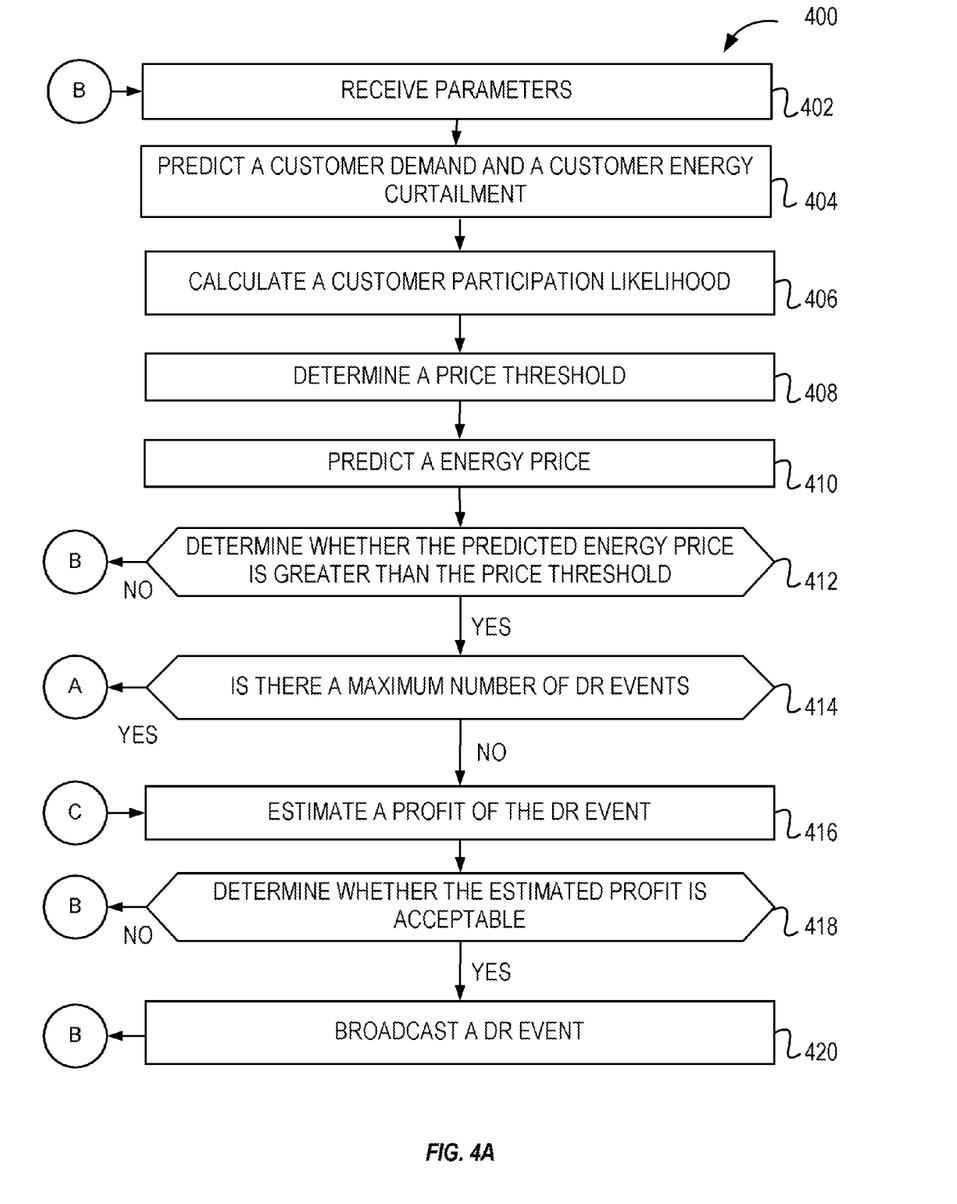
FIGS. 4A and 4B are a flow diagram of an example method of DR event issue assessment.
Figure 4B:
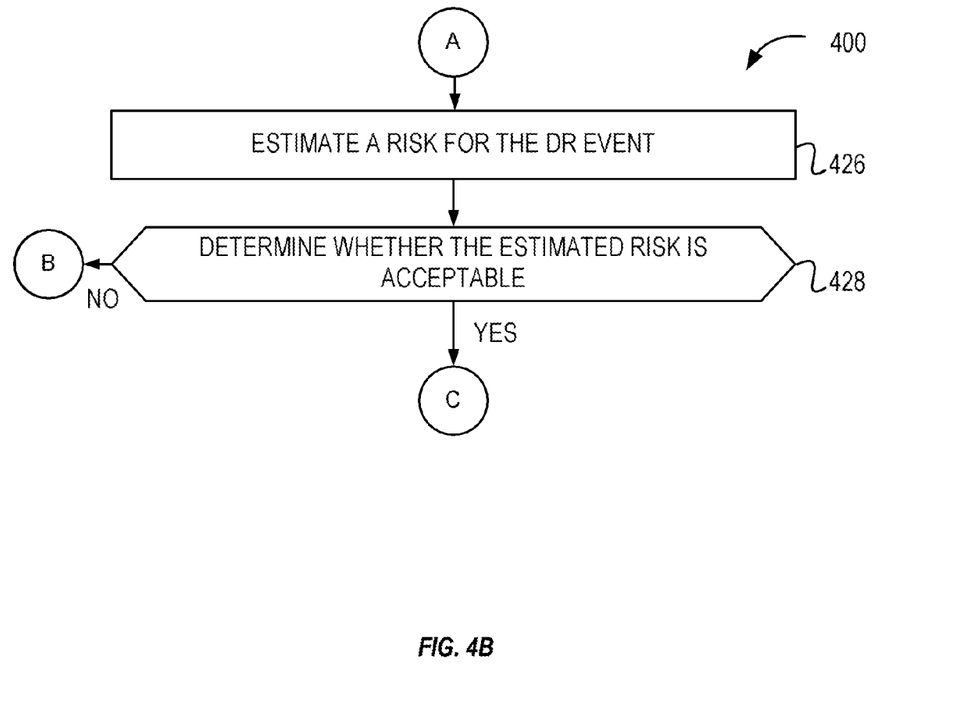

FIGS. 4A and 4B are a flow diagram of an example method 400 of DR event issue assessment, arranged in accordance with at least one embodiment described herein. The method 400 may be performed in a DR system such as the DR system 100 of FIG. 1 in which the utility 104 provides electricity to the sites 130. Similar methods may be implemented mutatis mutandis in systems in which other resources are provided by the utility 104.

The method 400 may be programmably performed in some embodiments by the DR server 106 described with reference to FIGS. 1 and 2. In some embodiments, the DR server 106 or another computing device may include or may be communicatively coupled to a non-transitory computer-readable medium (e.g., the memory 222 of FIG. 2) having stored thereon programming code or instructions that are executable by a processor (such as the processor 224 of FIG. 2) to cause a computing device and/or the DR server 106 to perform the method 400. Additionally or alternatively, the DR server 106 may include the processor 224 described above that is configured to execute computer instructions to cause the DR server 106 or another computing device to perform the method 400. Although illustrated as discrete blocks, various blocks may be divided into additional blocks, combined into fewer blocks, or eliminated, depending on the desired implementation.

The method 400 may begin at block 402. At block 402, parameters may be received. The parameters received at block 402 may include parameters and one or more updated parameters. For example, the parameters may include contractual parameters, ambient condition data, historical data, and energy price data. The updated parameters may include updated contractual parameters, updated ambient condition data, updated historical data, updated energy price data, some portion thereof, or some combination thereof.

At block 404, a customer demand and a customer energy curtailment may be predicted. For example, the customer demand may be predicted for each customer based on a THI and the customer energy curtailment may be predicted for each of the customers based on the THI and a control strategy. For example, the customer energy curtailment may be predicted for each of the customers based on the historical data of similar events in the past.

At block 406, a customer participation likelihood may be calculated. For example, the customer participation likelihood may include a random variable with a particular probability distribution based on the historical data.

At block 408, a price threshold may be determined. For example, the price threshold may be determined using an optimization equation such as described above. The price threshold may represent an energy price at which issuing a DR event is more profitable than not issuing the DR event.

At block 410, an energy price may be predicted. For example, an energy price may be predicted for a particular time period based on real-time energy prices and/or day-ahead energy prices.

At block 412, it may be determined whether the predicted energy price is greater than the price threshold. In response to the real-time energy price being less than the price threshold ("No" at block 412), the method 400 may proceed to block 402 and may repeat one or more of blocks 402, 404, 406, 408, and 410. When the real-time energy price being greater than the price threshold ("Yes" at block 412), the method 400 may proceed to block 414.

At block 414, it may be determined whether there is a maximum number of DR events. For example, in some DLC programs, a utility and/or a DR aggregator may agree to limit a number of issued DR events. When there not is a maximum number of DR events ("No" at block 414), the method may proceed to block 416. When there is a maximum number of DR events ("Yes" at block 414), the method may proceed to block 426 in FIG. 4B.

Referring to FIG. 4B, at block 426, a risk may be estimated for the DR event. At block 428, it may be determined whether the estimated risk is acceptable. In some embodiments, when the predicted energy price is greater than the price threshold and the risk is acceptable, the DR event may be broadcast to customers.

When the estimated risk is not acceptable ("No" at block 428), the method 400 may proceed to block 402. The method 400 may then repeat one or more of blocks 402, 404, 406, 408, 410, 412, 414, and 426. When the estimated risk is acceptable ("Yes" at block 428), the method 400 may proceed to block 416 in FIG. 4A.

At block 416, a profit of the DR event may be estimated. In some embodiments, the profit may be estimated as a percentage savings or a net savings that may be actualized by the utility and/or the DR aggregator by issuing the DR event. At block 418, it may be determined whether the estimated profit is acceptable. When the estimated profit is not acceptable ("No" at block 428), the method 400 may proceed to block 402. The method 400 may then repeat one or more of blocks 402, 404, 406, 408, 410, 412, 414, 426, 428, and 416. In response to the estimated profit being acceptable ("Yes" at block 428), the method 400 may proceed to block 420. At block 420, DR event information may be broadcast. For example, DR event information may include a command broadcast to multiple appliances. The method 400 may continue to block 402 and repeat one or more of blocks 402, 404, 406, 408, 410, 412, 414, 426, 428, 416, 418, and 420.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of demand response (DR) event issue assessment, the method comprising:
   receiving parameters that include one or more of contractual parameters, ambient condition data, historical data, and energy price data related to two or more sites;
   predicting a customer demand and a customer energy curtailment based on one or more of the parameters;
   calculating a customer participation likelihood based on one or more of the parameters;
   determining a price threshold based on one or more of the parameters, the customer energy curtailment, the customer demand, and the customer participation likelihood;
   comparing the price threshold to a predicted energy price;
   responsive to the price threshold being greater than the predicted energy price, implementing a DR event, the implementing the DR event including broadcasting DR event criteria to appliances at the sites that include commands that turn the appliances off or on according to a control strategy of the DR event,
   wherein:
   the price threshold represents an energy price at which issuing a DR event is more profitable than not issuing the DR event; and
   the determining the price threshold is performed according to an optimization equation:

$$\min(P_{iTH}) | \{ E[R_{DR}(\vec{A}_i) - \text{Cost}_{DR}(\vec{A}_i, P_{iTH}) - \text{Inc}_{DR}(\vec{A}_i)] \geq E[R - \text{Cost}(P_{iTH})] \}, \text{ in which:}$$

min( )|{ } represents an operation to determine a minimum value of a variable in the parentheses ( ) such that a condition in the brackets { } is satisfied;
E[ ] represents an expected value;
$P_{iTH}$ represents a price threshold;
$R_{DR}( )$ represents a DR event revenue;
$\text{Cost}_{DR}( )$ represents a DR event cost;
$\text{Inc}_{DR}( )$ represents an incentive paid to participate in a DR event;
R represents a non-DR event revenue;
Cost( ) represents a non-DR event cost;
i represents an interval in which a price threshold is determined; and
$\vec{A}_i$ represents a random variable that denotes the customer participation likelihood at an interval i.

2. The method of claim 1, further comprising predicting an energy price for a particular time period.

3. The method of claim 1, wherein:
   the ambient condition data includes a temperature-humidity index (THI) and the historical data includes historical energy usage data of one or more customers;
   the customer demand is predicted as a function of the THI; and
   the customer energy curtailment is predicted as a function of the THI and a control strategy.

4. The method of claim 1, wherein the customer participation likelihood includes a random variable with a particular probability distribution based on the historical data.

5. The method of claim 1, further comprising:
   estimating a risk of missing a future DR event opportunity;
   determining whether the risk is acceptable; and
   broadcasting the DR event in response to the risk being acceptable.

6. The method of claim 5, wherein the risk is estimated according to an equation:

$$\text{risk} = \frac{T - E_i}{T} \times \alpha;$$

and wherein:
risk represents an estimated risk;
T represents a number of future days that an energy price is expected to be more than a price threshold, which is predicted at least partially from the historical data;
α represents a reliability of the predicted number of future days that the energy price is expected to be more than the price threshold; and
$E_i$ represents a number of future events indicator.

7. The method of claim 1, further comprising generating a table of price thresholds relative to temperature-humidity index (THI) and control strategy.

8. The method of claim 1, further comprising estimating a profit if the DR event is issued according to one or more of equations:

$$\text{savings \%} = \frac{E[R_{DR}(\vec{A}_i) - \text{Cost}_{DR}(\vec{A}_i, P_R) - \text{Inc}_{DR}(\vec{A}_i)] - E[R - \text{Cost}(P_R)]}{E[R - \text{Cost}(P_R)]} \times 100;$$

-continued and $$\text{savings \$} = E[R_{DR}(\vec{A_i}) - \text{Cost}_{DR}(\vec{A_i}, P_R) - \text{Inc}_{DR}(\vec{A_i})] - E[R - \text{Cost}(P_R)],$$

and wherein
$P_R$ represents a predicted energy price;
savings % represents an estimated percentage savings; and
savings$ represents an estimated net savings.

9. The method of claim 1, wherein:
the DR event revenue is calculated according to a first equation:

$$R_{DR}(\vec{A_i}) = \sum_j \sum_c R(c)A_i(c, j)[D_i(c, THI) - K_i(c, THI, s)] + \sum_j \sum_c R(c)[1 - A_i(c, j)]D_i(c, THI);$$

the DR event cost is calculated according to a second equation:

$$\text{Cost}_{DR}(\vec{A_i}, P_{iTH}) = \sum_j \sum_c P_{iTH} A_i(c, j)[D_i(c, THI) - K_i(c, THI, s)] + \sum_j \sum_c P_{iTH}[1 - A_i(c, j)]D_i(c, THI) + \sum_j \sum_c \text{Cost}_{DR-Op}(c)A_i(c, j);$$

the non-DR event revenue is calculated according to a third equation:

$$R = E_i \sum_c R(c)D_i(c, THI);$$

the non-DR event cost is calculated according to a fourth equation:

$$\text{Cost}(P_{iTH}) = E_i \sum_c P_{iTH} D_i(c, THI);$$

and wherein
c represents an indexing variable related to customers;
j represents a second indexing variable designating future DR events;
R represents non-DR event revenue;
R(c) represents an energy price for a specific customer identified by the indexing variable c;
$D_i($ $)$ represents a predicted customer demand at an interval designated by a variable i;
$K_i($ $)$ represents the predicted customer energy curtailment at an interval designated by a variable i;
THI represents a temperature-humidity index (THI);
s represents a control strategy;
$E_i$ represents a number of future events indicator;
$\text{Cost}_{DR-Op}($ $)$ represents operational costs for issuing a DR event;
$A_i(c, j)$ represents a probability that a specific customer assigned an indexing variable c will participate in a next j events; and $1 - A_i(c, j)$ represents a probability that a specific customer assigned an indexing variable c will not participate in the next j events.

10. A non-transitory computer-readable medium having encoded therein programming code executable by a processor to perform operations comprising:
receiving parameters that include one or more of contractual parameters, ambient condition data, historical data, and energy price data;
predicting a customer demand and a customer energy curtailment based on one or more of the parameters related to two or more sites;
calculating a customer participation likelihood based on one or more of the parameters;
determining a price threshold based on one or more of the parameters, the customer energy curtailment, the customer demand, and the customer participation likelihood;
comparing the price threshold to a predicted energy price;
responsive to the price threshold being greater than the predicted energy price, implementing a DR event, the implementing the DR event including broadcasting DR event criteria to appliances at the sites that include commands that turn the appliances off or on according to a control strategy of the DR event,
wherein:
the price threshold represents an energy price at which issuing a DR event is more profitable than not issuing the DR event; and
the determining the price threshold is performed according to an optimization equation:

$$\min(P_{iTH})|\{E[R_{DR}(\vec{A_i}) - \text{Cost}_{DR}(\vec{A_i}, P_{iTH}) - \text{Inc}_{DR}(\vec{A_i})] \geq E[R - \text{Cost}(P_{iTH})]\}, \text{ in which:}$$

min( )|{ } represents an operation to determine a minimum value of a variable in the parentheses ( ) such that a condition in the brackets { } is satisfied;
E[ ] represents an expected value;
$P_{iTH}$ represents a price threshold;
$R_{DR}($ $)$ represents a DR event revenue;
$\text{Cost}_{DR}($ $)$ represents a DR event cost;
$\text{Inc}_{DR}($ $)$ represents an incentive paid to participate in a DR event;
R represents a non-DR event revenue;
Cost( ) represents a non-DR event cost;
i represents an interval in which a price threshold is determined; and
$\vec{A_i}$ represents a random variable that denotes the customer participation likelihood at an interval i.

11. The non-transitory computer-readable medium of claim 10, wherein the operations further comprise predicting an energy price for a particular time period.

12. The non-transitory computer-readable medium of claim 10, wherein:
the ambient condition data includes a temperature-humidity index (THI) and the historical data includes historical energy usage data of one or more customers;
the customer demand is predicted as a function of the THI; and
the customer energy curtailment is predicted as a function of the THI and a control strategy.

13. The non-transitory computer-readable medium of claim 10, wherein the customer participation likelihood includes a random variable with a particular probability distribution based on the historical data.

14. The non-transitory computer-readable medium of claim 10, further comprising:
estimating a risk of missing a future DR event opportunity;
determining whether the risk is acceptable; and
broadcasting the DR event in response to the risk being acceptable.

15. The non-transitory computer-readable medium of claim 14, wherein the risk is estimated according to an equation:

$$\text{risk} = \frac{T - E_i}{T} \times \alpha;$$

and wherein:
risk represents an estimated risk;
T represents a number of future days that an energy price is expected to be more than a price threshold, which is predicted at least partially from the historical data;
α represents a reliability of the predicted number of future days that the energy price is expected to be more than the price threshold; and
$E_i$ represents a number of future events indicator.

16. The non-transitory computer-readable medium of claim 10, wherein the operations further comprise generating a table of price thresholds relative to temperature-humidity index (THI) and control strategy.

17. The non-transitory computer-readable medium of claim 10, wherein the operations further comprise estimating a profit if the DR event is issued according to one or more of equations:

$$\text{savings \%} = \frac{E[R_{DR}(\vec{A_i}) - \text{Cost}_{DR}(\vec{A_i}, P_R) - \text{Inc}_{DR}(\vec{A_i})] - E[R - \text{Cost}(P_R)]}{E[R - \text{Cost}(P_R)]} \times 100;$$

and $$\text{savings \$} = E[R_{DR}(\vec{A_i}) - \text{Cost}_{DR}(\vec{A_i}, P_R) - \text{Inc}_{DR}(\vec{A_i})] - E[R - \text{Cost}(P_R)],$$

and wherein
$P_R$ represents a predicted energy price;
savings % represents an estimated percentage savings; and
savings$ represents an estimated net savings.

18. The non-transitory computer-readable medium of claim 10, wherein:
the DR event revenue is calculated according to a first equation:

$$R_{DR}(\vec{A_i}) = \sum_j \sum_c R(c)A_i(c, j)[D_i(c, THI) - K_i(c, THI, s)] +$$

-continued
$$\sum_j \sum_c R(c)[1 - A_i(c, j)]D_i(c, THI);$$

the DR event cost is calculated according to a second equation:

$$\text{Cost}_{DR}(\vec{A_i}, P_{iTH}) = \sum_j \sum_c P_{iTH}A_i(c, j)[D_i(c, THI) - K_i(c, THI, s)] +$$
$$\sum_j \sum_c P_{iTH}[1 - A_i(c, j)]D_i(c, THI) + \sum_j \sum_c \text{Cost}_{DR-Op}(c)A_i(c, j);$$

the non-DR event revenue is calculated according to a third equation:

$$R = E_i \sum_c R(c)D_i(c, THI);$$

the non-DR event cost is calculated according to a fourth equation:

$$\text{Cost}(P_{iTH}) = E_i \sum_c P_{iTH}D_i(c, THI);$$

and wherein:
c represents an indexing variable related to customers;
j represents a second indexing variable designating future DR events;
R represents non-DR event revenue;
R(c) represents an energy price for a specific customer identified by the indexing variable c;
$D_i(\ )$ represents a predicted customer demand at an interval designated by a variable i;
$K_i(\ )$ represents the predicted customer energy curtailment at an interval designated by a variable i;
THI represents a temperature-humidity index (THI);
s represents a control strategy;
$E_i$ represents a number of future events indicator;
$\text{Cost}_{DR-OP}(\ )$ represents operational costs for issuing a DR event;
$A_i(c, j)$ represents a probability that a specific customer assigned an indexing variable c will participate in a next j events; and
$1 - A_i(c, j)$ represents a probability that a specific customer assigned an indexing variable c will not participate in the next j events.

* * * * *